(12) United States Patent
Lihotzky-Vaupel

(10) Patent No.: US 6,338,867 B1
(45) Date of Patent: Jan. 15, 2002

(54) METHOD FOR THE PRODUCTION OF PASTE PRODUCTS

(76) Inventor: Wolfram Lihotzky-Vaupel, Deggendorfer Strasse 14, D-94557 Niederalteich (DE)

( * ) Notice: Subject to any disclaimer, the term of this patent is extended or adjusted under 35 U.S.C. 154(b) by 0 days.

(21) Appl. No.: 09/287,661

(22) Filed: Apr. 7, 1999

(30) Foreign Application Priority Data

Apr. 16, 1998 (EP) .............................................. 98106904

(51) Int. Cl.$^7$ .............................. A23P 1/12; A21D 6/00; A21D 8/02
(52) U.S. Cl. ........................ 426/557; 426/498; 426/504; 426/516; 426/519; 426/520
(58) Field of Search ................................ 426/549, 555, 426/557, 653, 498, 504, 516, 519, 520

(56) References Cited

U.S. PATENT DOCUMENTS

| | | | |
|---|---|---|---|
| 1,203,361 A | * 10/1916 | Kohman et al. | |
| 4,844,935 A | * 7/1989 | Fere et al. | 426/549 |
| 4,948,612 A | 8/1990 | Keller et al. | 426/549 |
| 5,089,283 A | * 2/1992 | Wilson | 426/498 |
| 5,126,159 A | 6/1992 | Manser et al. | 476/549 |
| 5,667,833 A | * 9/1997 | Juengling et al. | 426/496 |
| 5,914,148 A | * 6/1999 | Kazemzadeh | 426/516 |

FOREIGN PATENT DOCUMENTS

| | | |
|---|---|---|
| DE | 1 156 032 | 10/1963 |
| EP | 0 351 423 B1 | 8/1993 |
| FR | 1 182 351 | 6/1959 |
| FR | 2 618 643 | 2/1989 |
| FR | 2 747 128 | 10/1997 |
| GB | 880 182 | 10/1961 |
| GB | 2 208 467 | 4/1989 |

* cited by examiner

Primary Examiner—Keith Hendricks
Assistant Examiner—Drew Becker
(74) Attorney, Agent, or Firm—Oblon, Spivak, McClelland, Maier & Neustadt, P.C.

(57) ABSTRACT

The invention relates to a method and a device for the production of paste products, in which a milled product such as flour or the like is mixed as the dry component with a liquid and the resulting dough mass is kneaded, the dry component being supplied into an extruder, the liquid in the extruder is supplied to the dry component and mixed therewith to give a dough mass. The dough is completely prepared within the extruder and at the extruder outlet is pressed into a desired paste product shape. This not only permits efficient, hygienic paste or dough product production, but also an exact setting of an air proportion in the finished product.

15 Claims, 1 Drawing Sheet

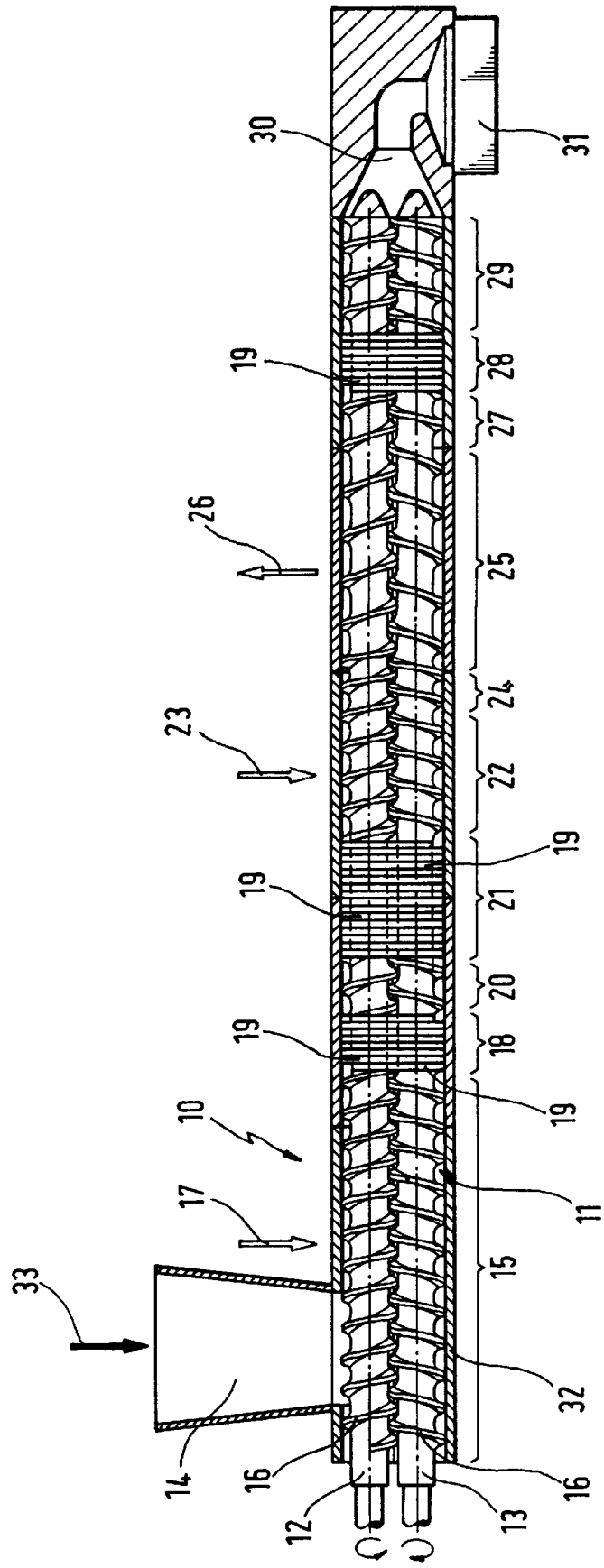

METHOD FOR THE PRODUCTION OF PASTE PRODUCTS

BACKGROUND OF THE INVENTION

The invention relates to a method for the production of paste products having a formed gluten framework, in which at least one powdery dough base like flour, dust, semolina or a mixture consisting essentially of these is mixed as a dry component with a liquid component, the dough mass being formed therefrom is kneaded by means of an extruder and a finished dough is formed into past products, wherein the temperature of the dough mass for the formation of the gluten framework is kept below 50° C. during carrying out of the method and to a device for the production of paste products, in particular for carrying out of the method according to any of the claims, having an extruder, at the outlet of which prepared dough can be transformed under pressure into a desired form of the past product.

EP 351 423 B1 describes a method according to the preamble for the production of dough for farinaceous pastes, in which a dry ground or milled product such as flour or the like is moistened with water in a premixer, so that the flour is brought into a moist, friable, loose state. This friable material is supplied by means of a hopper or downpipe to a feed screw of a kneading machine. The dough is then formed in a continuous process in an extruder-like apparatus and from there it is transferred into a following mechanism for pressing and molding.

The supply of the flour in the moist, friable and sticky state is unsatisfactory as a result of possible adhesion in the feed hopper and due to hygienic disadvantages. In addition, the necessary transfer of the dough following the continuous dough production process into a following pressing and molding means is unsatisfactory from the standpoint of a continuous process operation.

FR-A-2 618 643 discloses an apparatus according to the preamble used for the production of baked dough. A mixture of flour, salt and sugar as well as fat is introduced by means of the opening into an extruder having two shafts rotating in the same direction. Introduction takes place by means of a further opening of a liquid phase consisting of flour, salt, sugar, water and fat into an extruder zone A. Following a first mixing in extruder zones A and B the dough is heated to 90 to 110°. In the following sections D and E cooling takes place to approximately 60° C., followed by a further supply of a mixture of flour, water, fat, etc, by means of a third opening. The dough is extruded following a further cooling.

U.S. Pat. No. 4,948,612 describes an apparatus for the production of a biscuit or cookie-like product. By means of a first supply device sugar is introduced into a double extruder with two shafts rotating in the same direction. As a result of compressive and shear forces in the extruder the sugar is melted and a temperature of 90 to 135° C. is reached. Water is then fed in by means of a pipe, whilst flour is introduced into the extruder by means of a second supply device. Until it is discharged from the extruder, said mass is to be kept at a temperature of 90 to 135° C.

These devices are not, or at best only suitable to a limited extent for the production of dough, which is in particular very sensitive to high temperatures, accompanied by the formation of a gluten framework.

SUMMARY OF THE INVENTION

The object of the invention is therefore to provide a paste or dough production method and device making it possible to produce dough products with a gluten framework in a simple and efficient manner.

According to the invention, this object is achieved by a particular method.

In this procedure a milled product-such as flour, dust or semolina is fed in or supplied to the extruder in dry form so that, compared with the supply of the already moistened flour, which then forms crumbs or lumps, there is a simpler dosing or metering under hygienically improved conditions as a result of a lack of moisture or wetness in the feed. The feeding or dosing in can therefore take place with a high dosing precision and in a more compact feed unit, the cleaning thereof being simplified. The method can be performed with a milled product constituted by cereals and in particular with milled wheat products of the gluten-rich hard wheat type. However, it is also suitable for milled products from legumes such as soya beans, if gluten framework constituents are present or are added in an adequate quantity. However, it is also possible to supply several dry components or mixtures thereof, which e.g. include vegetable powders or egg powder.

The liquid is fed into the dry components or the milled product or fluor on its feed path into the kneading zone. The flour is then rapidly and uniformly moistened with the inflowing or injected liquid component, which is normally water, so that subsequently the dough mass consisting of flour and water can be kneaded. It is also possible to feed in other or additional liquid components, such as liquid egg, dissolved vegetable powders, etc.

By counter-rotating the extruder shafts an excellent kneading effect is achieved. Although the counter-rotation of the extruder shafts results in high shear forces, a respective generation of friction heat is avoided by working in a defined air volume. This air volume reduces the friction in the dough and provides a heat buffer avoiding a super heating of the heat-sensitive gluten framework.

In the proposed method a clearly defined air volume is worked into the dough mass by operating the extruder at below its feed capacity. Less milled product is fed into the conveyor screw zone than the said screw could discharge, i.e. the possible discharge capacity of the screw is greater than the flour infeed. This operating mode can be achieved in conjunction with a controlled flour metering and flour infeed and a speed regulation of the extruder screws. By working air into the dough mass it is possible to produce more loose dough or paste products such as home-made noodles, which are also beneficial to persons having to follow a diet. This is particularly advantageous for the production of instant noodles and the time for blanching, oiling or frying can be reduced or these procesces can be omitted. For a clearly defined setting of the air proportion, which can also be virtually zero, the complete preparation and processing of the dough in an extruder is important.

If, according to an advantageous method form, the dough mass is processed with mixing and/or shearing elements for uniform air distribution, a particularly uniform, homogenized air distribution can be achieved in the dough mass, which gives the finished, dried paste or dough product an attractive appearance with a uniform material and optical outward form.

Further dry or liquid components can be supplied as additives to the dough mass during feeding, kneading or in general during processing. For this purpose, e.g. in a conveying or processing zone of the extruder it is possible to supply and in particular inject through openings in a casing wall liquid egg, tomato pulp, spinach, dyes, salt, etc.

In each section of the production process the dough mass is kneaded in order to homogenize it and therefore increase the product quality.

Appropriately air under pressure can be supplied to the dough mass or can be removed under vacuum or underpressure. Thus, a proportion or partial volume of the air or other gaseous substances in the dough mass can be influenced, in order to obtain a clearly defined air volume of the dough mass prior to the finishing of the dough. The injection or suction of air from the dough mass preferably takes place in an extruder gassing or degassing zone and is carried out by means of a pressure apparatus, which can be preferably connected to a decompression zone.

According to an advantageous method step a clearly defined air porosity is produced in the dough mass by a clearly defined pressure setting in the mixing and kneading zone.

In the method according to the invention, a uniform air distribution can be set in the dough mass by a reverse mixing. Part of the dough mass is briefly moved counter to the main feed direction, so that a further homogenization is obtained.

Appropriately there is a planned temperature control in the individual method steps by means of heating and/or cooling the dough mass. Thus, as a function of the temperature of the raw or starting materials such as flour and water, the ambient temperature and the heat produced during dough production, the dough mass can be kept at the desired temperature. The dough mass temperature is maintained below 50° C. and preferably at 35 to 40° C. This ensures that a temperature is maintained, which is appropriate for the mechanical processing of the dough mass and which must not be exceeded for building up a good gluten framework.

In the method the dough mass is fed and produced in a double shaft extruder with two counter-rotating extruder shafts. This makes it possible to obtain an adequate feed and kneading capacity and an improved air introduction or mixing in the dough mass.

Appropriately the extruder shafts are operated at a speed of approximately 50 r.p.m. This speed leads to a good mixing and kneading result without excessively heating and therefore damaging the dough. Minor variations from this speed are possible, so that when operating below the feed capacity a speed adaptation for a precisely defined air incorporation is obtained.

The method is used with particular advantage if the dough, after finishing and on removing from the extruder is shaped under pressure immediately to a paste product. This leads to a closed process sequence from the supply of the flour and liquid to the removal of the dough to a mould, which has hygienic advantages and also the advantage of continuous, undisturbed operation.

According to the invention, the above object is also achieved by a particular device. The device comprises a casing with at least one driven extruder shaft with a first screw conveyor zone and at least one kneading zone an inlet opening for a milled product such as flour as dry components of the dough, a moisturizing mechanism for the supply of a liquid component to the dry milled product in the vicinity of the first screw conveyor zone and an outlet opening for the prepared dough. As with said device only dry flour or the like is supplied through the inlet opening, due to the lack of moisture, the hygienic conditions at the feed or intake hopper are improved. In addition, the dry flour can be more easily metered and supplied as compared with moist, lumpy flour, which can stick to the surfaces of the hopper.

In the case of the device according to the invention there is a clearly defined mixing of air into the dough mass as a result of operating below the feed capacity. The supply of dry flour or a similar milled product through the hopper and the speed of the screw conveyors are controlled in such a way that the discharge capacity of said screw conveyors (i.e. the possible volume flow) is higher than the milled product quantity actually supplied.

Appropriately the extruder shaft contains a compression zone and a decompression zone, in order to assist a mixing and kneading of the dough mass through changing pressures. In addition, it is possible to provide a suction device for sucking air out of the casing and therefore out of the dough mass in the vicinity of the decompression zone. This makes it possible to set the desired air content in the dough mass.

According to an advantageous embodiment of the extruder the extruder shaft contains a reverse mixing zone following on to the decompression zone. In said reverse mixing zone a brief reverse movement of at least part of the dough mass in opposition to the main feed direction leads to a uniform air distribution in the dough mass.

For this purpose it is advantageous for the extruder shaft to have in the area of the reverse mixing zone reverse mixing elements or a screw conveyor, which has a backward pitch with openings for the dough mass. In order to be able to supply the liquid component of the dough or water, the moisturizing mechanism can have a liquid supply via the casing and/or via the extruder shaft. It is appropriate if the liquid supply has outlet openings for the pressureless entry or discharge nozzles for the injection of liquid under pressure.

The extruder is constructed as a double shaft extruder with two extruder shafts for counter-rotation, which leads to a good mixing of air into the dough mass.

The extruder shafts can be made in one piece or like the casing, can be assembled segmentally from individual functional segments for the different zones.

The device according to the invention can be used with particular advantage if a mold for the dough is located at the extruder outlet. The dough mass can then flow directly and under pressure from the extruder into the mold, where the desired dough or paste product shapes are produced.

Appropriately the mold is made from brass or bronze and has on the mold faces a Teflon coating, so that there is a friction-reducing and virtually adhesion-free surface.

The device can contain a temperature control means with which by the supply or removal of heat or cooling in the individual sections or zones of the extruder shaft, it is possible to set a dough temperature below 50° C. For an optimized dough production the dough temperature is kept at approximately 35 to 40° C.

For an optical, taste and structural dough improvement a supply device for additives, which is in particular located at a feed zone, is provided, so that it is e.g. possible to supply liquid egg, tomato pulp, spinach, dyes, additional gluten framework constituents, water, salt and other substances.

In a preferred embodiment, each extruder shaft has the following, interconnecting zones: a feed and first conveyor screw zone, a first kneading zone with kneading tools, a second screw conveyor zone, a second kneading zone with kneading tools for homogenizing the dough, a third screw conveyor zone, a compression zone, a decompression zone, a reverse mixing zone for a counter-conveying or counter-feed movement, a kneading zone for fine air distribution and a fourth screw conveyor zone.

The compression zone can be formed by a screw conveyor with increasing screw pitch and/or increasing channel depth and a decompression zone formed by a screw conveyor with decreasing screw pitch and/or decreasing channel depth.

DETAILED DESCRIPTION OF THE DRAWINGS

The invention is described in greater detail hereinafter relative to an embodiment of the inventive device and with reference to the attached drawing, which is a sectional view of an extruder with a double screw.

The device shown has an extruder 10 with a double screw or double shaft 11, which is formed by two parallel shafts or screws 12, 13, which are placed in an extruder casing 32 and can be driven in speed-regulated manner in opposition by means of a not shown drive. The two shafts 12, 13 can be superimposed or juxtaposed in a horizontal plane, so that the drawing is to be correspondingly considered as a side view or a plan view.

The device contains a feed or supply device 14, such as e.g. a funnel or hopper, with which a dry component of the dough mass can be supplied in metered form in a first zone 15 to a double screw 11 (symbolically represented by the arrow 33, the hopper being offset by 90° on considering the drawing as a plan view). For conventional paste or dough products, the dry component is a milled cereal product such as flour, dust or semolina, which essentially differ with respect to the fineness of milling thereof. The feed device 14 can be in the form of a hopper with a dosing mechanism, such as e.g. a slide or an adjustable diaphragm (not shown). In this first feed zone 15 each extruder shaft 12, 13 has a screw conveyor 16 with a substantially constant pitch and therefore forms a first feed and conveying section for the supplied dry component or flour. The screw conveyor speed and therefore the feed speed and feed capacity are so mutually adjustable together with the dosing mechanism that a clearly defined air quantity is supplied to the conveyed flour volume in this zone by operating at below the feed capacity.

In said feed zone 15 e.g. water is supplied to the dry flour as a liquid component of the dough (symbolically represented by arrow 17). By means of the two screws the moistened flour is mixed to a dough mass and the air volume contained in the screw channels is incorporated into said dough mass. The water is injected by means of nozzles in the casing wall, which e.g. are arranged in roughly annular manner following on to the hopper (not shown). Alternatively or additionally water can flow out or be injected via axial channels into the extruder shafts 12, 13 and by means of one or more axially and/or radially distributed discharge openings or nozzles to the flour. In order to obtain a desired dough temperature the water can be heated or cooled to the necessary temperature.

Following on to the feed zone 15 the extruder has a kneading zone 18, in which the extruder shafts 12, 13 have kneading tools 19, e.g. kneading disks or fingers, which engage in one another and thoroughly knead the dough mass during rotation. A following feed zone 20 having screw conveyors is used for transporting the dough mass into a second kneading zone 21 with kneading tools 19 in which the dough mass is homogenized during the kneading process, so that the air contained in the dough mass is contained in a uniformly distributed manner. In the following screw conveyor zone 22 additives can be supplied by means of casing openings or injected with pressurized air (symbolically represented by arrow 23) and intermixed. Such additives are e.g. liquid egg, tomato pulp, spinach, dyes, salt and similar coloring, structural and flavoring substances.

Following the addition of the additives, the dough mass is compressed in a compression zone 24. For this purpose the extruder screws can have a reduced screw pitch and/or a reduced channel depth. This is followed by a decompression zone 25, which is e.g. formed by extruder screws with an increased screw pitch and/or increased channel depth. In the decompression zone 25 to the casing is connected a suction device by means of which part of the air or other gaseous substances contained in the dough mass can be removed again. Suction, e.g. by means of a connected vacuum chamber, is symbolically represented by the arrow 26. Through the sucking off of a clearly defined air volume the remaining air proportion in the dough mass can be adjusted.

In the following reverse mixing zone 27, the extruder shafts have reverse mixing elements or backwardly acting screw sections with openings (not shown) for the passage of the dough mass during its forwards conveying movement. In the reverse mixing zone 27 there is a particularly initimate mixing of the dough mass leading to a uniform air distribution therein.

This is followed by a kneading zone 28 with kneading tools 19 for producing a fine air distribution for a fine-pored dough mass.

In a final feed zone 29 the finished dough mass is conveyed by means of screw conveyors into a discharge channel 30 and from there, under contact pressure of the screw conveyors, is directly forced into a mold 31 connected to the extruder in order to mold dough or paste products such as noodles, spaghetti, etc.

For the temperature control of the dough mass in the extruder it is possible to provide in or on the casing wall surrounding the extruder shafts heating and/or cooling elements or ducts, which in individual segments over the length of the extruder can, if necessary, exert a heating or cooling action on the dough mass. Thus, the dough mass can be kept within a preferred temperature range for dough production.

The extruder shafts can be assembled from individual segments corresponding to the different zones, in that e.g. the individual screw elements or kneading tools, which have a central opening, are engaged on a rod-like eccentric shaft and are prevented from rotating there.

The mold can either be made entirely from Teflon or can at least have Teflon-coated surfaces on the molding openings for the dough mass.

The components of the extruder, such as the feed or compression screws or kneading tools, as well as the extruder casing can be made from or coated with a food-compatible metal, particularly high quality steel.

Apart from the indicated working in of ambient air, it is also possible to use a special protective or preparation gas, such as an antioxidant gas, so that even more hygienic and careful dough or paste product production is possible. In particular, the entire working area of the extruder, including the drying agent supply, can be under a desired gas atmosphere with a certain overpressure, which makes it difficult for bacteria to penetrate the working area.

What is claimed is:

1. Method for the production of paste products having a formed gluten framework, in which at least one powdery dough base selected from the group consisting of flour, dust, and semolina is mixed as a dry component with a liquid component, the dough mass being formed therefrom is kneaded by means of an extruder and a finished dough is formed into paste products, wherein the temperature of the dough mass for the formation of the gluten framework is kept below 50° C. during carrying out of the method, wherein, the extruder comprises two extruder shafts which are driven in counter-rotation, the dry component is fed directly into a first screw conveyor zone of the counter-rotating extruder, the liquid component is introduced separately from the dry component into the first screw conveyor zone of the counter-rotating extruder, the counter-rotating extruder in the first screw conveyor zone is driven below its feeding capacity, wherein the dry component and the liquid component are mixed to a dough mass with a defined admixture of a gas, within the counter-rotating extruder the dough mass is kneaded and the finished dough is formed, and at an outlet of the extruder the dough is pressed under pressure by means of screw conveyors directly into a mold for molding the dough into a desired form of the paste product.

2. Method according to claim 1, wherein, a defined volume of gas is fed into the dough mass and is worked into the said dough mass, wherein ambient air or a special protective gas or preparation gas may be used as the gas.

3. Method according to claim 1, wherein, the dough mass is processed using mixing elements and/or shearing elements for the uniform distribution of the gas.

4. Method according to claim 1, wherein, into the extruder, additional dry components and/or liquid components are fed.

5. Method according to claim 1, wherein, the dough mass is homogenized in a kneading section.

6. Method according to claim 2, wherein, into the dough mass in the extruder is introduced gas under pressure.

7. Method according to claim 1, wherein, from the dough mass is extracted gas in a gas extraction zone of the extruder.

8. Method according to claim 6, wherein, a defined gas porosity is produced in the dough mass through an adjustable pressure control in the mixing and kneading zone.

9. Method according to claim 1, wherein, a uniform distribution of gas in the dough mass is set through a reverse mixing zone.

10. Method according to claim 1, wherein, a specific regulation of temperature, in the individual steps of processing through heating and/or cooling of the dough mass is carried out, wherein the regulation of the temperature is accomplished through the casing and/or the extruder shaft.

11. Method according to claim 1, wherein, the temperature of the dough mass is kept to 35 to 40° C.

12. Method according to claim 1, wherein, the extruder shafts have a rotational speed of approximately 50 revolutions per minute.

13. Method according to claim 1, wherein, after being finished and when discharged from the extruder the dough is pressed under pressure through a form tool and is parted off with a cutting tool.

14. Method according to claim 2, wherein the gas is oxygen, nitrogen, or carbon dioxide.

15. Method according to claim 4, wherein said additional dry components and/or liquid components are fed during the conveying, kneading or processing.

* * * * *